(12) United States Patent
Weinrotter et al.

(10) Patent No.: US 8,858,094 B2
(45) Date of Patent: Oct. 14, 2014

(54) FIBER OPTIC CONNECTOR SYSTEM

(75) Inventors: Martin Weinrotter, Stuttgart-Botnang (DE); Pascal Woerner, Stuttgart (DE); Juergen Raimann, Weil Der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 1118 days.

(21) Appl. No.: 12/734,502

(22) PCT Filed: Oct. 10, 2008

(86) PCT No.: PCT/EP2008/063659
§ 371 (c)(1),
(2), (4) Date: Sep. 1, 2010

(87) PCT Pub. No.: WO2009/059867
PCT Pub. Date: May 14, 2009

(65) Prior Publication Data
US 2011/0008006 A1     Jan. 13, 2011

(30) Foreign Application Priority Data

Nov. 9, 2007   (DE) .......................... 10 2007 053 415

(51) Int. Cl.
*G02B 6/42* (2006.01)
*G02B 6/36* (2006.01)
*G02B 6/00* (2006.01)
*G02B 6/38* (2006.01)
*F02P 23/04* (2006.01)

(52) U.S. Cl.
CPC ............ *G02B 6/4292* (2013.01); *G02B 6/3813* (2013.01); *G02B 6/4296* (2013.01); *F02P 23/04* (2013.01); *G02B 6/3849* (2013.01)

USPC ................... 385/88; 385/77; 385/78; 385/84; 385/92; 385/139

(58) Field of Classification Search
CPC ...... H02G 3/081; H01R 24/20; G02B 6/3893; G02B 6/3821; G02B 6/4292
USPC ................. 385/53, 58–59, 60, 62, 66, 70, 72, 385/76–78, 81, 84, 88–94, 139
See application file for complete search history.

(56) References Cited

U.S. PATENT DOCUMENTS

| | | | |
|---|---|---|---|
| 5,379,362 A * | 1/1995 | Kawamura | 385/92 |
| 5,708,745 A | 1/1998 | Yamaji et al. | |
| 6,550,978 B2 * | 4/2003 | De Marchi | 385/60 |
| 6,561,699 B1 * | 5/2003 | De Marchi | 385/58 |
| 7,025,507 B2 * | 4/2006 | de Marchi | 385/66 |
| 2003/0219216 A1 | 11/2003 | Yang et al. | |

FOREIGN PATENT DOCUMENTS

| | | |
|---|---|---|
| EP | 0 570 652 | 11/1993 |
| EP | 0 613 030 | 8/1994 |
| EP | 1 139 128 | 10/2001 |
| EP | 1 271 204 | 1/2003 |
| WO | 99/40466 | 8/1999 |
| WO | 02/071122 | 9/2002 |

\* cited by examiner

*Primary Examiner* — Uyen Chau N Le
*Assistant Examiner* — Michael Mooney
(74) *Attorney, Agent, or Firm* — Kenyon & Kenyon LLP (57) ABSTRACT

A fiber optic connector system is described which includes a plug and a socket. The optically active surfaces of the plug and socket are automatically protected from soiling as soon as the connection is opened.

17 Claims, 8 Drawing Sheets

FIBER OPTIC CONNECTOR SYSTEM

FIELD OF THE INVENTION

The present invention relates to a fiber optic connector system.

BACKGROUND INFORMATION

In laser ignition systems, a pumped light source and an ignition laser are spatially separated from one another because the ignition laser must be situated in the immediate proximity of the combustion chambers of the internal combustion engine, and because the vibrations and operating temperatures of the internal combustion engine have a negative effect on the service life of the pumped light source. An optical fiber is present between the pumped light source and the ignition laser to span the distance between the pumped light source and the ignition laser. This optical fiber transports the pumped light generated by the pumped light source to the ignition laser. At that location the actual ignition pulse is generated in a solid-state laser, and is guided into the combustion chamber through a focusing lens and a combustion chamber window. The intended ignition plasma which triggers the combustion of the air/fuel mixture present in the combustion chamber is generated at that location.

The pumped light source and the optical fiber have long service lives of approximately 30,000 operating hours, while the ignition laser has a much shorter service life and must have maintenance at much shorter intervals. It is therefore necessary to be able to easily separate the optical fiber and the ignition laser from one another.

Fiber optic plug-in connector systems are discussed in WO 02/071122 A1 and EP 0 570 652 A2, in which a plug has an arrangement for closing the plug, and the arrangement may be opened as necessary. These plug-in connector systems operate using guide grooves and a slide control for the arrangement for closing the plug. These types of systems are therefore comparatively complex in their manufacture, and do not have the robustness required for operation under harsh conditions in the engine compartment of a motor vehicle.

In addition, for this plug-in connector system only one approach is described for protecting the optically active surfaces inside the plug or the optical fiber which ends in the plug. Protection of the optically active surfaces of a socket which is compatible with the plug is not described in the cited related art.

Dust and dirt are present in the engine compartment of a motor vehicle. Since both the optical fiber and the ignition laser are sensitive to soiling of their optically active surfaces, there is a need to provide a fiber optic connector system which in the separated state prevents soiling of the optically active surfaces of the plug and socket.

SUMMARY OF THE INVENTION

An object of the exemplary embodiments and/or exemplary methods of the present invention is to provide a connector system which protects the optical surfaces of both the plug and the socket from soiling when the connection is open. It is a further aim for the connector system to be easily operable and to withstand the harsh operating conditions in the engine compartment of an internal combustion engine over the entire service life of the vehicle.

This object is achieved according to the exemplary embodiments and/or exemplary methods of the present invention by a plug for a fiber optic connection, having a housing and an optical fiber situated inside the housing, the plug having an arrangement for closing the housing, and the arrangement automatically releasing the housing when the plug is inserted into a socket which is compatible with the plug, and by the fact that a protective sleeve is provided on the housing, that the protective sleeve surrounds an optically active surface of the plug, in particular one end of an optical fiber, on all sides, and that the arrangement for closing the housing are designed as at least one flap which is rotatably mounted on an end face of the protective sleeve.

The object of the exemplary embodiments and/or exemplary methods of the present invention is likewise achieved by a socket for a fiber optic connection according to the other independent Claim 3 by the fact that a protective sleeve is likewise provided on the socket, the protective sleeve surrounds the socket on all sides, and the socket has at least one flap which is rotatably mounted on an end face of the protective sleeve.

Due to the fact that the plug, as well as the socket which is compatible with the plug, each have a protective sleeve, it is possible to protect the optically active surfaces of the plug and the socket from soiling as soon as the connection is opened.

By configuring the arrangement according to the exemplary embodiments and/or exemplary methods of the present invention for closing the housing of the plug or of the socket as rotatably mounted flaps, complicated control of the arrangement for closing, with the aid of grooves and sliding elements, may be dispensed with. Furthermore, the protective sleeves may thus be designed to be concentric to the plug and the socket, and for the connector system according to the present invention it is therefore possible for the protective sleeves of the plug and socket to move inside one another in a telescoping manner and to mutually open the flaps of the respective other protective sleeve. As a result, not only is it possible for the plug and socket to automatically close as soon as the connection is separated, but also the optically active surfaces of the plug and socket are automatically exposed again as soon as the connection is re-established by inserting the plug into the socket.

The at least one flap may be rotatably mounted according to the exemplary embodiments and/or exemplary methods of the present invention on the protective sleeves with the aid of a hinge, in particular a film hinge. When the protective sleeve has two flaps, in one particular embodiment of the present invention it is provided that the rotational axes of the two flaps are parallel. This specific embodiment is particularly suitable when the protective sleeves have a square or rectangular cross section. Namely, in that case it is possible to provide the rotational axes of the flap parallel to two walls of the protective sleeve, so that despite very simple kinematics the entire cross sectional area of the protective sleeves may be closed by one or two flaps, and the protective sleeves of the plug and socket are able to easily move inside one another in a telescoping manner when the connection is established.

A further advantageous embodiment of the present invention provides that the flaps on the protective sleeves automatically return to a closed position as soon as the connection is separated. This may be easily achieved by providing the hinges with an elastic design.

If the hinges are designed as film hinges, this may be achieved by an appropriate shape and selection of material of the protective sleeve and flaps. Otherwise, a helical torsion spring or a coil spring may be provided at the hinges. Alternatively, in each case a helical torsion spring could be provided between the protective sleeve and the flaps.

In one particularly advantageous embodiment of the present invention, the protective sleeve is guided in an axially displaceable manner on the housing of the plug or of the socket, and is pressed under spring load against an end-face stop. When the connection is established, it is thus possible to first axially move the protective sleeve on the housing of the plug or of the socket so that the flaps which are part of the protective sleeve are opened to the outside, and the connection may subsequently be established.

Further advantages and advantageous embodiments of the present invention are provided in the following drawing, the description thereof, and the claims. All features disclosed in the drawing, the description thereof, and the other subject matter may be essential to the exemplary embodiments and/or exemplary methods of the present invention, individually and in any given combination.

BRIEF DESCRIPTION OF THE DRAWINGS

FIG. 2 shows a specific embodiment of the fiber optic connector systems according to the present invention.

DETAILED DESCRIPTION

Figure 1A:
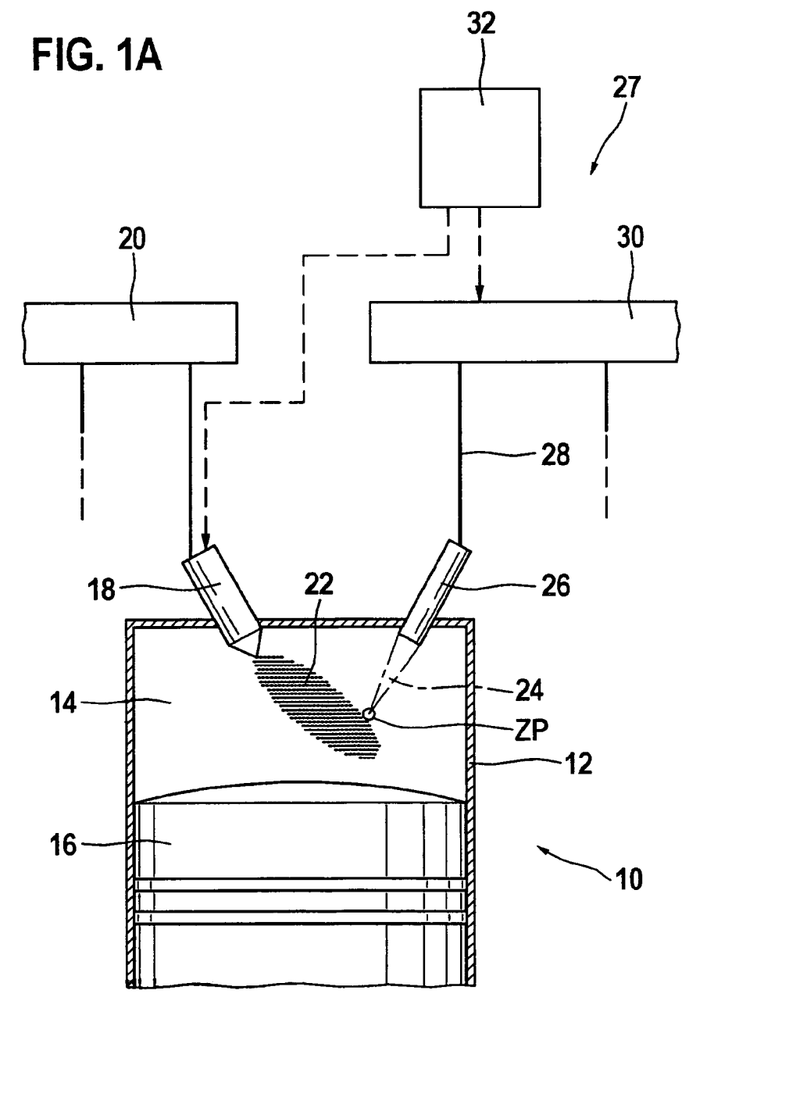
FIG. 1a shows a schematic illustration of an internal combustion engine having a laser-based ignition device.

An internal combustion engine overall is denoted by reference numeral 10 in FIG. 1a. The internal combustion engine may be used to drive a motor vehicle, not illustrated, or a generator for power generation. Internal combustion engine 10 includes multiple cylinders, of which only one is denoted by reference numeral 12 in FIG. 1a. A combustion chamber 14 for cylinder 12 is delimited by a piston 16. In the illustrated exemplary embodiment, fuel passes directly into combustion chamber 14 via an injector 18, which is connected to a fuel pressure accumulator 20, also referred to as a rail. Alternatively, the mixture may be formed in an intake manifold, not illustrated.

Fuel 22 injected into combustion chamber 14 or the fuel-air mixture drawn into the combustion chamber is ignited with the aid of a laser pulse 24 which is emitted into combustion chamber 14 by an ignition device 27 which includes an ignition laser 26. For this purpose, laser unit 26 is fed via an optical fiber device 28 with pumped light which is provided by a pumped light source 30. Pumped light source 30 is controlled by a control device 32, which also activates injector 18.

Figure 1B:
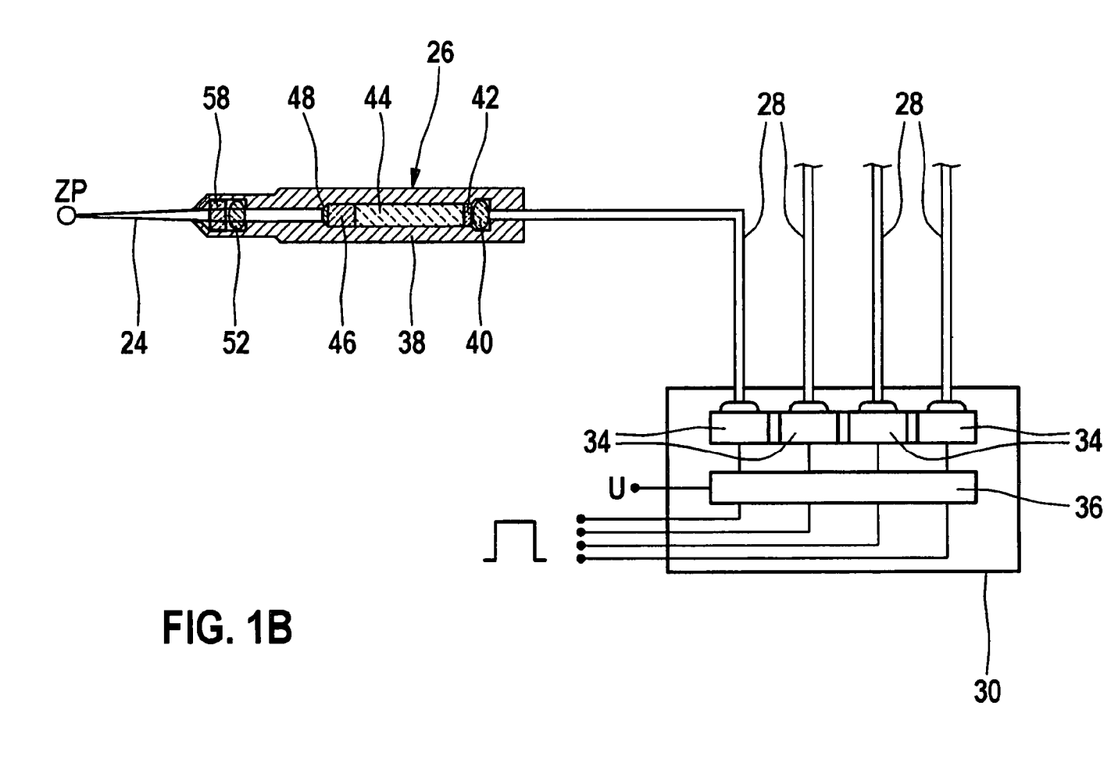
FIG. 1b shows a schematic illustration of the ignition device from FIG. 1.

As shown in FIG. 1b, pumped light source 30 feeds multiple optical fiber devices 28 for various ignition lasers 26, each of which is associated with a cylinder 12 of internal combustion engine 10. For this purpose, pumped light source 30 has multiple individual laser light sources 34 which are connected to a pulse current supply 36. Due to the presence of multiple individual laser light sources 34, in a manner of speaking a "static" distribution of pumped light to the various laser units 26 is achieved, so that an optical distributor or the like between pumped light source 30 and ignition lasers 26 is not necessary.

Ignition laser 26 has, for example, a laser-active solid 44 with a passive Q-switch 46, which together with an input mirror 42 and an output mirror 48 forms an optical resonator. Acted upon by pumped light generated by pumped light source 30, ignition laser 26 generates, in a manner known per se, a laser pulse 24 which is focused by a focusing lens 52 onto an ignition point ZP located in combustion chamber 14 (FIG. 1a). The components present in housing 38 of ignition laser 26 are separated from combustion chamber 14 by a combustion chamber window 58.

Figures 2A, 2B, 3:
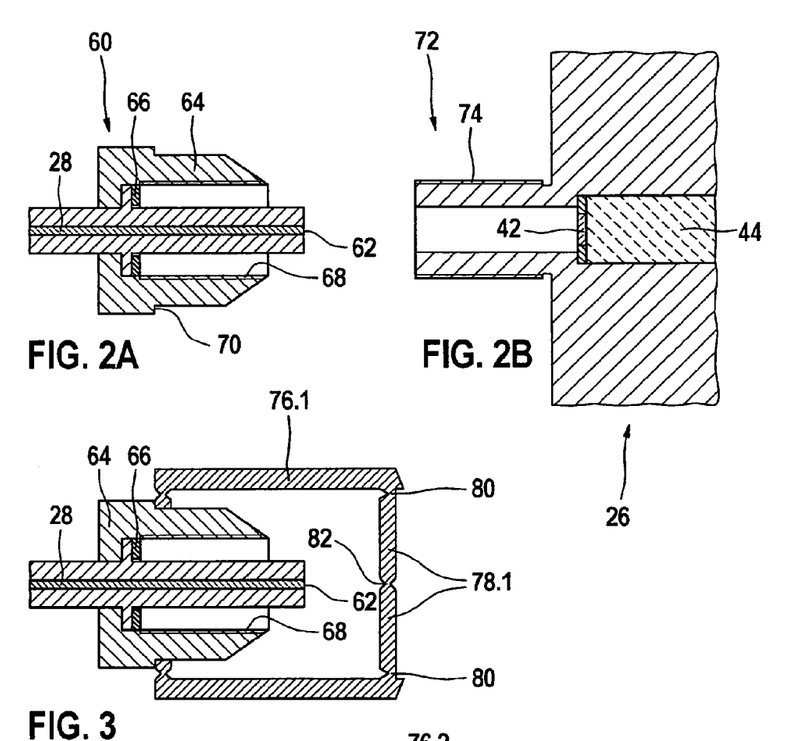
FIG. 3 shows another specific embodiment of the fiber optic connector systems according to the present invention.

FIG. 2a illustrates a plug 60 in a sectional view without the protective sleeve according to the present invention. An optical fiber device 28 is present inside plug 60. In the exemplary embodiment illustrated in FIG. 2a, end-face end 64 of the optical fiber device represents the optically active surface of plug 60. Plug 60 includes a housing 64 and a seal 66. An inner thread 68 is provided on housing 64. A shoulder 70 is present on an outer circumference of housing 64. At that location housing 64 has a rotationally symmetrical design.

FIG. 2b illustrates a socket 72, likewise in a sectional view, which is compatible with plug 60. In the exemplary embodiment illustrated in FIG. 2b, socket 72 is part of a laser device 26 which, as previously described for FIG. 1b, includes, among other things, an input mirror 42 and a solid-state laser 44. Input mirror 42 is the optically active surface of socket 72.

Of course, socket 72 could also be situated on the end of an optical fiber 28 (not illustrated in FIG. 2b).

Socket 72 has an outer thread 74 which is compatible with inner thread 68 of plug 60. Optical fiber 28, i.e., end face 62 thereof, is connected to input mirror 42 of laser device 26 by inserting plug 60 into socket 72 and screwing housing 64 of plug 60 to outer thread 74 of the socket.

As clearly shown in FIGS. 2a and 2b, optically active surfaces 62 and 42 of plug 60 and socket 72, respectively, are exposed to soiling from dust, oil, or other materials, essentially without protection, when the connection is open. To prevent this, according to the exemplary embodiments and/or exemplary methods of the present invention a protective sleeve 76.1 is provided on plug 60.

This protective sleeve 76.1 is illustrated in FIG. 3. Protective sleeve 76.1 is supported on shoulder 70 of housing 64 in the axial direction, and is rotatable relative to housing 64. Plug 60 and optically active surface 62 thereof are surrounded on all sides by protective sleeve 76.1. Two flaps 78.1 are integrally molded onto protective sleeve 76.1. In the exemplary embodiment illustrated in FIG. 3, protective sleeve 76.1 together with integrally molded flaps 78.1 is designed as a plastic molded part which is used only once.

Flaps 78.1 are mounted on protective sleeve 76.1 so as to be rotatable via film hinges 80. A first predetermined breaking point 82 is provided between flaps 78.1. A seal (not illustrated) may be present between flaps 78.1 instead of first predetermined breaking point 82.

In FIG. 3 flaps 78.1 are closed, so that optically active surface 62 of optical fiber device 28 is completely protected from dirt and moisture by protective sleeve 76.1 and closed flaps 78.1.

Figure 4:
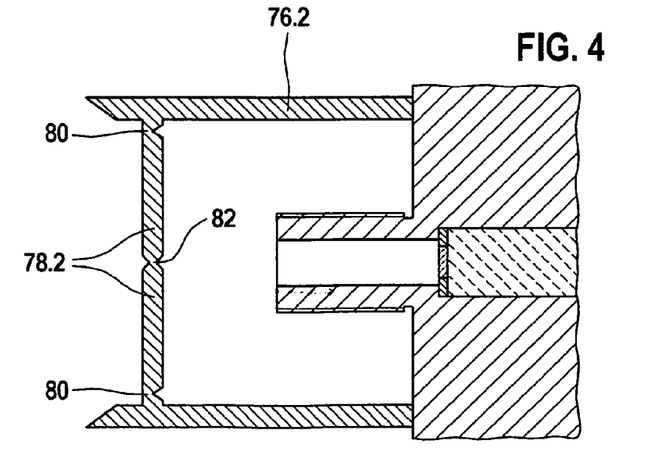
FIG. 4 shows another specific embodiment of the fiber optic connector systems according to the present invention.

FIG. 4 illustrates a similar protection of socket 72, with the aid of a protective sleeve 76.2 having flaps 78.2 and a first predetermined breaking point 82. In principle, the designs of protective sleeves 76.1, 76.2 of plug 60 and socket 72 are the same. However, the diameters of protective sleeves 76.1, 76.2 are different so that protective sleeves 76.1, 76.2 of plug 60 and socket 72 may be pushed into one another in a telescoping manner when plug 60 is to be inserted into socket 72.

Establishing a connection between optical fiber 28 and laser device 26 with the aid of the connector system according to the present invention is explained with reference to FIG. 5.

For the sake of clarity, not all of the reference numerals are shown.

Figure 5A:
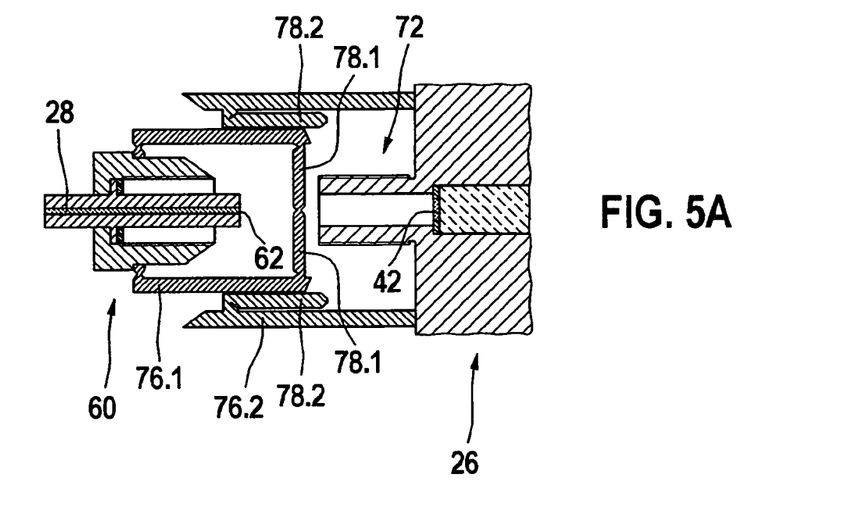
FIG. 5 shows another specific embodiment of the fiber optic connector systems according to the present invention.

In a first step illustrated in FIG. 5a, first predetermined breaking point 82 between flaps 78.2 of socket 72 is broken with the aid of protective sleeve 76.1 of plug 60, and flaps 78.2 are opened inwardly. In this state, flaps 78.1 of protective sleeve 76.1 are still closed. This is achieved by the fact that flaps 78.1 of protective sleeve 76.1 of plug 60 are not flush with the end face of protective sleeve 76.1 of plug 60. The diameter of protective sleeve 76.2 is dimensioned in such a way that when flaps 78.2 are open, protective sleeve 76.1 may be moved farther into protective sleeve 76.2.

Figure 5B:
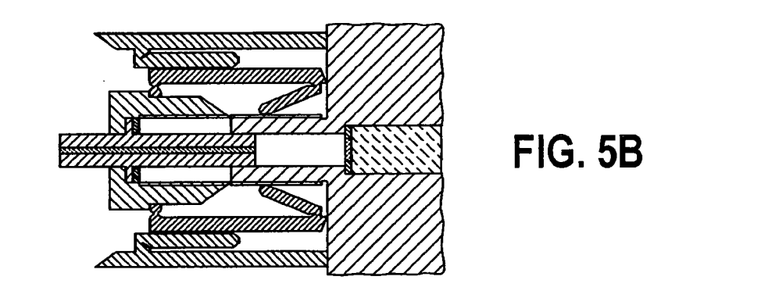

As soon as flaps 78.1 of plug 60 meet socket 72, associated predetermined breaking point 82.1 breaks and flaps 78.1 open inwardly, i.e., in the direction of housing 64. This state is illustrated in FIG. 5b.

Figure 5C:
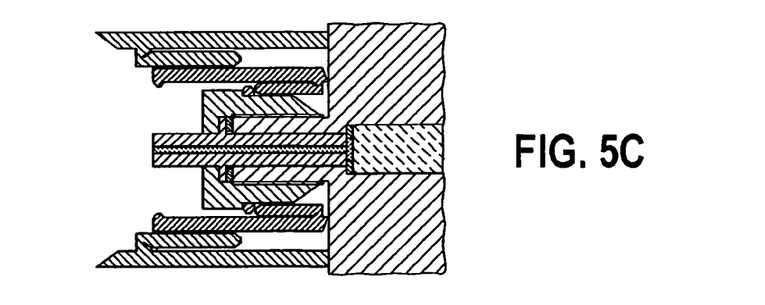

When housing 64 of plug 60 has been screwed to socket 72, as illustrated in FIG. 5c, end face 62 of optical fiber 28 rests directly on input mirror 42 of the laser device, thus enabling transmission of pumped light, i.e., injection of pumped light from optical fiber 28 into laser device 26 (FIG. 5c).

Figure 6:
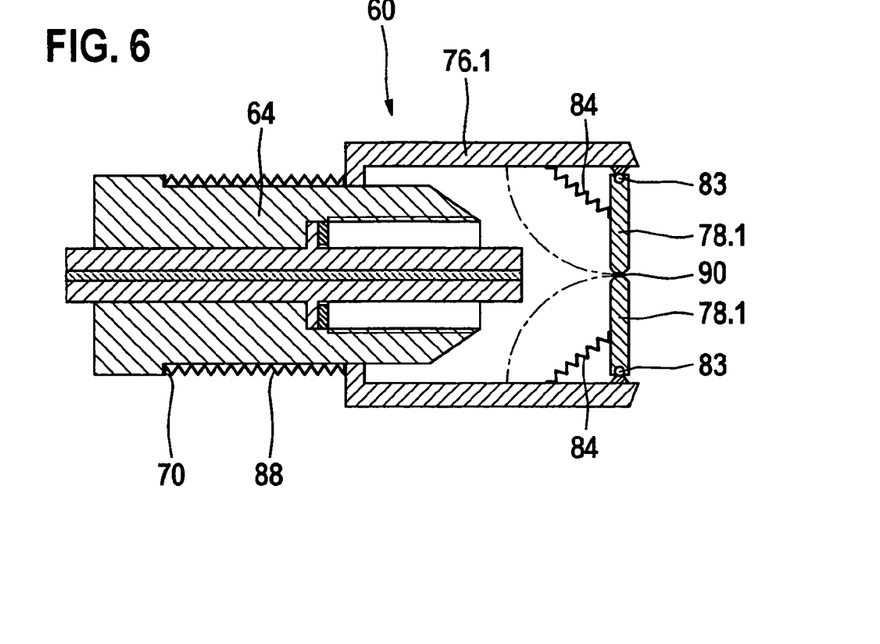
FIG. 6 shows another specific embodiment of the fiber optic connector systems according to the present invention.
Figure 7:
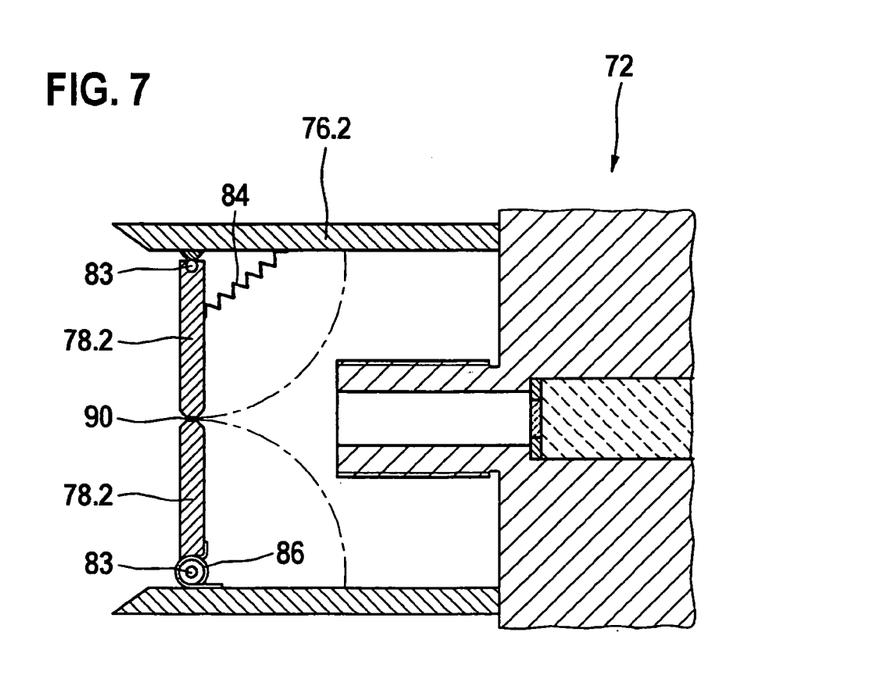
FIG. 7 shows another specific embodiment of the fiber optic connector systems according to the present invention.

FIGS. 6 and 7 illustrate a further exemplary embodiment of a plug 60 according to the present invention and a socket 72 according to the present invention. In this exemplary embodiment, flaps 78.1 and 78.2 are mounted on protective sleeves 76.1 and 76.2, respectively, so as to be rotatable via a hinge 83. In addition, a helical compression spring 84 is provided between flap 78.1 and protective sleeve 76.1 on the one hand and between flap 78.2 and protective sleeve 76.2 on the other hand. Helical compression springs 84 ensure that flaps 78.1, 78.2 automatically return to the closed positions illustrated in FIGS. 6 and 7 as soon as the connection is opened. As an alternative to helical compression springs 84 illustrated, helical torsion springs 86 (see FIG. 7) or coil springs (not illustrated) may be used.

Figure 8:
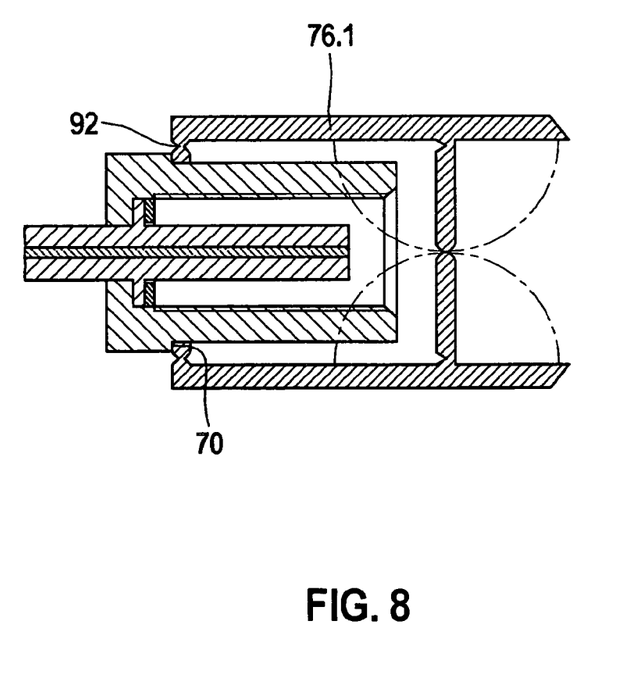
FIG. 8 shows another specific embodiment of the fiber optic connector systems according to the present invention.
Figure 9A:
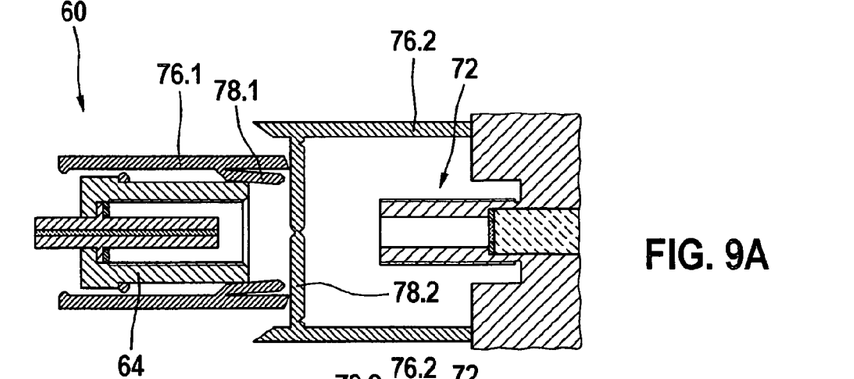
FIG. 9 shows another specific embodiment of the fiber optic connector systems according to the present invention.
Figure 9B:
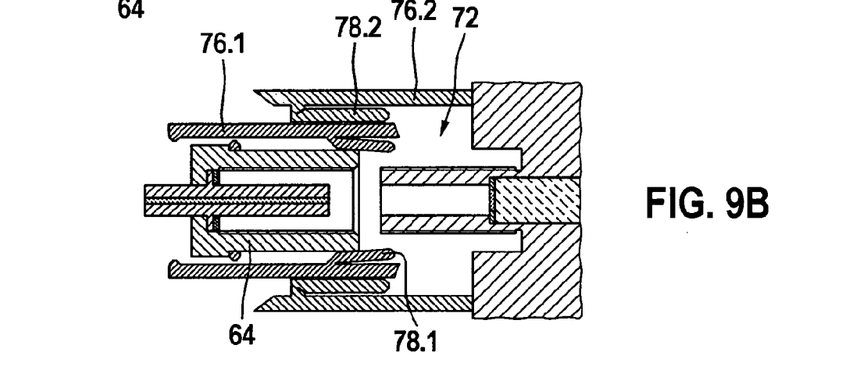
Figure 9C:
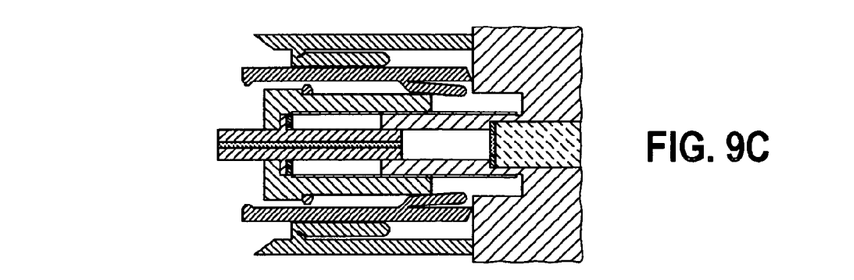
Figure 9D:
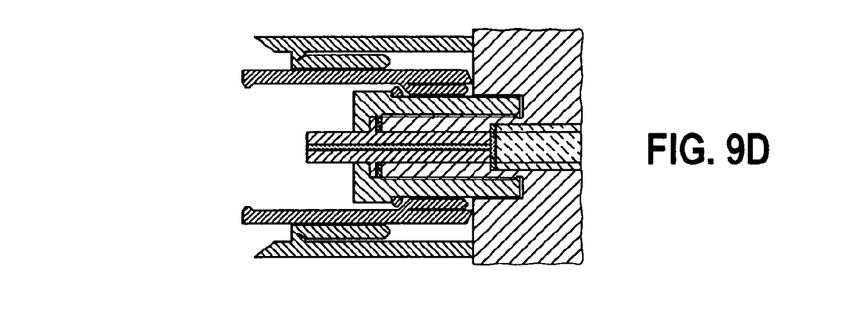

In the exemplary embodiment illustrated in FIG. 6, protective sleeve 76.1 is accommodated on housing 64 in an axially displaceable manner. A helical compression spring 88 is situated between shoulder 70 and protective sleeve 76.1. The spring rigidity of helical compression spring 88 is dimensioned in such a way that protective sleeve 76.1 is first moved axially to the rear, in the direction of shoulder 70, and flaps 78.1 then open outwardly when plug 60 is screwed into socket 72. An effect similar to that obtained with the aid of helical compression springs 88 may be achieved when a second predetermined breaking point 92 is provided on protective sleeve 76.1 in the region of shoulder 70 (see FIG. 8).

In this exemplary embodiment, a seal 90 is provided in each case between flaps 78.1 and 78.2. This is particularly advantageous when the protective sleeves are to be used multiple times.

FIGS. 9a through 9d illustrate the joining of plug 60 and corresponding socket 72. Unlike the sequence according to FIGS. 5a-c, flaps 76.1 of plug 60 open outwardly after second predetermined breaking point 72 is broken, and as a result protective sleeve 76.1 of the plug may be pushed to the rear in the axial direction. Housing 64 of plug 60 then inwardly opens flaps 78.2 of socket 72.

Figure 10:
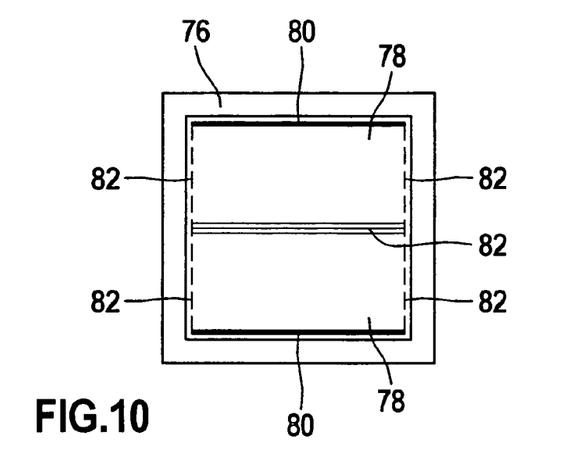
FIG. 10 shows another specific embodiment of the fiber optic connector systems according to the present invention.
Figure 11:
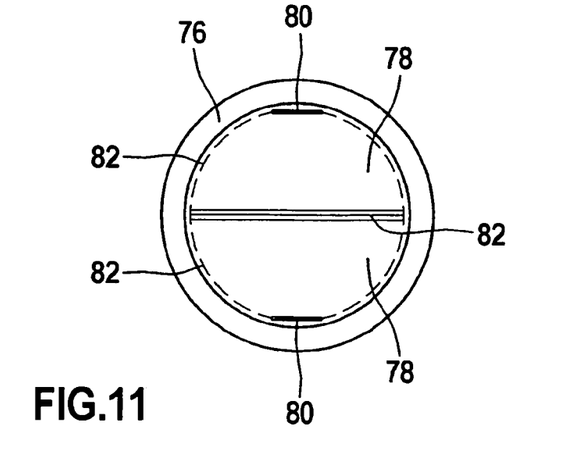
FIG. 11 shows another specific embodiment of the fiber optic connector systems according to the present invention.

FIG. 10 illustrates a protective sleeve 76 according to the present invention having a square cross section and two flaps 78, in front view. FIG. 11 illustrates an alternative exemplary embodiment in which protective sleeve 76 has a circular cross section.

What is claimed is:

1. A plug for a fiber optic connection, comprising:
   a housing;
   at least one protective sleeve separate from and provided on the housing;
   an optical fiber situated inside the housing, wherein the protective sleeve surrounds the optical fiber on all sides; and
   an arrangement for closing the housing, wherein the arrangement automatically exposes the housing when the plug is inserted into a socket which is compatible with the plug, and includes at least one flap which is rotatably mounted on an end face of the protective sleeve,
   wherein the protective sleeve is attached to the housing so as to be displaceable as a whole relative to the housing along an axis substantially parallel to a longitudinal axis of the optical fiber in the housing, and
   wherein the arrangement for closing the housing is a non-sliding element.

2. The plug of claim 1, wherein the at least one flap is opened by a socket, which is compatible with the plug, when the socket is inserted into the plug.

3. The plug of claim 1, wherein the at least one flap is rotatably fastened to the protective sleeve via at least one hinge, which is a film hinge.

4. The plug of claim 1, wherein the protective sleeve has two flaps, and the rotational axes of the flaps are parallel to one another.

5. The plug of claim 1, wherein the protective sleeve has one of a square cross-section and a rectangular cross-section.

6. The plug of claim 1, wherein the rotational axes of the flaps are parallel to two walls of the protective sleeve.

7. The plug of claim 1, wherein the flaps of the plug automatically return to a closed position as soon as the socket is pulled from the plug.

8. The plug of claim 3, wherein the at least one hinge includes hinges having an elastic configuration.

9. The plug of claim 8, wherein one of a helical torsion spring and a coil spring is provided on each of the hinges.

10. The plug of claim 8, wherein a helical compression spring is provided in each case between the protective sleeve and the flaps.

11. The plug of claim 1, wherein the at least one flap is configured to open inwardly.

12. The plug of claim 1, wherein the at least one protective sleeve of the plug and of a socket are situated concentrically when the plug and the socket are pushed together.

13. The plug of claim 1, wherein the protective sleeve is fastened so as to be axially displaceable on the housing of the plug.

14. The plug of claim 1, wherein the protective sleeve is pressed spring-loaded against an end-face stop of the housing.

15. The plug of claim 1, further comprising:
   a spring connecting the protective sleeve to a shoulder of the housing to provide resistance to but allow displacement of the protective sleeve relative to the housing.

16. The plug of claim 15, wherein the spring is located about an exterior surface of the housing.

17. The plug of claim 1, wherein the at least one flap provides a surface enclosing the housing, when the arrangement for closing the housing is closed, that is perpendicular to the longitudinal axis of the optical fiber in the housing.

\* \* \* \* \*